Aug. 24, 1943.  P. PFISTER  2,327,740
CHANGE SPEED GEAR FOR THREE GRADUATED SPEED RATIOS
Filed Feb. 17, 1942
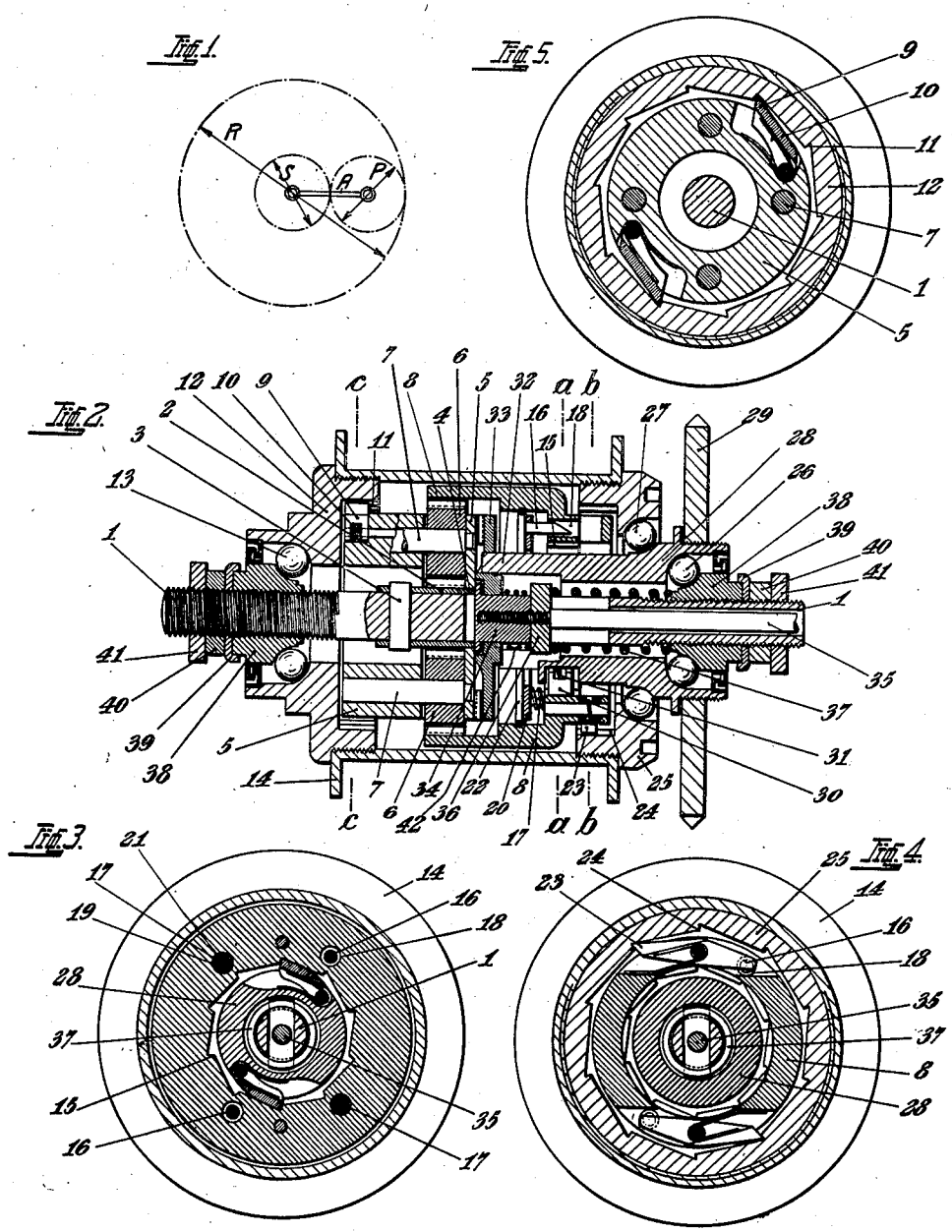
Pierre Pfister
INVENTOR
BY
his ATTORNEY Patented Aug. 24, 1943

2,327,740

UNITED STATES PATENT OFFICE 2,327,740

CHANGE SPEED GEAR FOR THREE GRADUATED SPEED RATIOS

Pierre Pfister, Sonceboz, Switzerland

Application February 17, 1942, Serial No. 431,227
In Switzerland March 21, 1941

2 Claims. (Cl. 74—280)

This invention relates to a change speed gear for three graduated speed ratios being particularly applicable to cycles and the like of the kind providing the change speed gear in the hub of the driving wheel.

The invention is based upon the principle of internal cyclic wheels, this principle being illustrated by the schematic view shown in Fig. 1 of the accompanying drawing.

The reference character S designates in a planetary gear the solar pinion, P the planetary pinion, R the internally toothed wheel and A the arm carrying the pinion P for rotation round the center of the solar pinion S.

The formulas ruling this gearing are well known. For instance, if the solar pinion S is kept stationary and if the arm A figures as driving part and the internally toothed wheel R as driven part of the gearing, the gear ratio from the driving part to the driven one is equal $$\frac{R+S}{R}$$

wherein the letters signify the number of teeth of the respective wheels. Choosing 20 teeth for S and 60 teeth for R, the gear ratio is 1.33. If the internally toothed wheel R figures as driving part and the arm A as driven part of the gearing, while the solar pinion S is stationary, the gear ratio is equal $$\frac{R}{R+S}=\frac{60}{60+20}=0.75$$

Evidently, three graduated speed ratios can be obtained with this gearing:

(1) A high speed ratio, when using the arm A as driving part and the internally toothed wheel R as driven part of the gearing, whereby the ratio is $$V_1=\frac{R+S}{R}$$

(2) A mean speed ratio, when directly driving the wheel R without using the cyclic gearing, whereby the ratio is $V_2=1$.

(3) A low speed ratio, when using the wheel R as driving part and the arm A as driven part of the gearing, whereby the ratio is $$V_3=\frac{R}{R+S}$$

According to the present invention the change speed gear for three graduated speed ratios comprises a driving wheel, a planetary gear driven by said driving wheel, three ratchet gears in each one of which pawls are provided to co-operate with the toothing of a ratchet wheel, the first of said ratchet gears being driven by the pinion support of said planetary gear for transmitting the rotation of the driving wheel at reduced speed upon the mechanism to be driven by the change speed gear; the second ratchet gear being driven by said driving wheel for transmitting the rotation at unaltered speed upon said mechanism, the third ratchet gear being driven by the internally toothed wheel of said planetary gear for transmitting the rotation at increased speed upon said mechanism, and a controlling organ adapted to bring the driving wheel in or out of engagement with the first cited ratchet gear and the third one, respectively.

The object of this invention is to simplify the speed changing operation and to permit a compact and solid construction of all parts of the change speed gear. It includes the advantage of permitting the operator to treadle while passing from the low speed ratio to the mean one and to the high one. Otherwise, it is necessary to stop treadling, or at least to treadle slower than in accordance with the speed of the cycle, while passing from the high speed to the mean one and from the mean speed to the low one.

The features of the invention will more particularly be apparent from the following description and claims, reference being had to the accompanying drawing which illustrates one preferred embodiment of the invention.

Fig. 1 is a diagram illustrating the transmission principle of the invention.

Fig. 2 is an axial section of the change speed gear.

Figs. 3 to 5 are cross sections along the lines $a$—$a$, $b$—$b$ and $c$—$c$, respectively, of Fig. 2.

The central axle 1 of the hub of a rear cycle wheel not completely illustrated is fixed on a support, for instance on the cycle frame. A pinion 2, that is a solar pinion of a planetary gear, is rigidly mounted on the axle 1 by means of a pin 3.

On the seating portion 4 of the pinion 2 is rotatably mounted a support 5 carrying four axles 7 with a freely rotatable pinion 6 on each thereof. An internally toothed wheel 8 is in gear with the four pinions 6 which are positioned at right angles from one another and keep thus the internally toothed wheel 8 in normal position.

The support 5 is provided with two pawls 9 (see Fig. 5) the outer ends of which are induced by means of springs 10 to co-operate with the internal toothing 11 of a ring cup 12. This ring cup 12 is screwed on the hub 14 of the wheel and is freely rotating on the ball bearing 13.

The views of Figs. 3 and 4 give details of the construction of the internally toothed wheel 8. The part 15 of this wheel 8, presenting the smallest diameter, is provided with teeth in the manner of a ratchet wheel.

The inner side of the wheel 8 carries a cut ring 22 which is partly inserted in an annular recess of said wheel. An annular disk 20 can move between the rear part 15 of the wheel 8 and said interior ring 22.

In the disk 20 are fixed two pins 16 each one having a canted outer end, and two other pins 17, the first cited pins 16 being adapted to penetrate through respective holes 18 of the rear part 15 of the wheel 8, while the second cited pins 17 are provided as guiding pins to penetrate into two one-eyed holes 21 of the wheel 8, wherein and round said pins 17 are located two spiral springs 19 which continually tend to press the annular disk 20 against the stop ring 22.

When the disk 20 is applied against the rear part 15 of the wheel 8, the canted ends of the pins 16 lift the tails of the pawls 23 belonging to the ratchet gear between the wheel 8 and the ring cup 25 which is screwed on the hub 14 and is provided with an internal toothing 24 for co-operation with said pawls 23. There are two definite positions of the pawls 23: A working position wherein the ends of the pawls 23 co-operate with the internal toothing 24 of the ring cup 25 and a retained position wherein the tails of the pawls 23 are lifted by means of the canted pins 16, so as to prevent the ends of the pawls from co-operation with the toothing 24 of the ring cup 25.

The driving wheel or pinion 29 generally being rotated by an endless chain running round the treadle wheel of the cycle is screwed on a support 28 which is rotating between two ball bearings 26 and 27. Into the support 28 are milled two recesses for two pawls 30 being pivotally mounted therein and constantly in gear, induced by springs 31, with the internal toothing 15 of the wheel 8. At the inner end of the support 28 are milled two opposed big teeth 32, each one comprising one quarter of the circumference thereof and, therefore, being of great solidity.

A driving plate 33 having a radial and plane ratchet toothing which is adapted to mesh with a corresponding radial toothing of the pinion support 5 of the planetary gear can be freely reciprocated between the two teeth 32 of the support 28. The plate 33 is revolving round the axle 1 and is integral in rotation with the support 28. The reciprocation of the plate 33 is effected by the intermediary of a support 34 which is slidable in a longitudinal slot of the axle 1.

This support 34 is screwed upon the threaded portion of an operating stem 35 which carries in addition a square 36 fixed between said support and the unthreaded portion of the stem and provided as guiding piece for the reciprocation within the longitudinal slot of the axle 1.

A restoring coil spring 37 disposed round the axle 1 bears against the square 36 and tends to press the square with the stem and the support 34 towards the planetary support 5. A chain or the like can be attached to the outer end of the stem 35, leading to the external manipulating organ of the change speed gear, which provides in known manner three marked setting positions in accordance with three predetermined positions of the operating stem 35 corresponding to the three speed ratios of the change speed gear.

A coil spring 42 is disposed round the support 34 between the square 36 and the plate 33 in order to keep the ratchet toothing of the plate 33 yieldingly in gear with the toothing of the pinion support 5 of the planetary gear when the support 34 is in the end position shown in Fig. 2.

Some supplementary parts are necessary for the working of the described change speed gear. However, they are well known and outside the scope of this invention. There are two nuts 38 screwed upon the axle 1 and each one providing a cup for the ball bearings 13 and 26, respectively, two fastening keys 39 fixing the position of the nuts 38, two other nuts or claws 40 for maintaining the axle 1 in an absolutely rigid position with respect to the cycle frame, and two external lock nuts 41.

The working of the change speed gear in the three predetermined positions for high, mean and low speed ratio respectively, is the following:

High speed ratio

The operating stem is so far not governed by the external manipulating organ, as the position of the support 34 and of the plate 33 is only determined by the effect of the restoring spring 37 which, by the intermediary of the square 36, keeps the toothing of the plate 33 in gear with the toothing of the pinion support of the planetary gear. In this position of the plate 33 the rotation of the chain pinion 29 is transmitted from the support 28 thereof by the intermediary of the plate 33 upon the planetary support 5, so that the four planetary pinions 6 revolve round the solar pinion 2. The internally toothed wheel 8 of the planetary gear is thereby rotated with a speed which is 1.33 times higher than the speed of the chain pinion 29. By means of the ratchet gear 23, 25 the rotation at increased speed is transmitted to the hub 14 of the rear cycle wheel.

The pawls 30 of the ratchet gear 8, 28, shown in Fig. 3, rotate with a lower speed than the internal toothing 15, so that they simply yield under the rotation of the latter.

In the same manner the pawls 9 of the ratchet gear 5, 12, shown in Fig. 5, rotate with a lower speed than the pawls 23 and the hub 14, so that they equally yield under the rotation of the internal toothing 11 of the ring cup 12.

Mean speed ratio

By means of the external manipulating organ the stem 35 is brought, against the effect of the restoring spring 37, into a middle position, whereby the toothing of the plate 33 is disengaged from the toothing of the pinion support 5 of the planetary gear. From this moment the pawls 30 are engaged with the internal toothing 15 of the wheel 8. The speed of the rotation transmitted from the chain pinion 29 and the support 28 by the intermediate pawls 30 upon the wheel 8 remains unaltered. The rotating pawls 23 being in gear with the internal toothing 24 drive the ring cup 25 and consequently the hub 14 with the same speed of rotation.

In this case the two pawls 9 of the ratchet gear 5, 12 rotate with a lower speed than the hub 14, so that they yield under the rotating toothing 11 of the ring cup 12.

Low speed ratio

By means of the external manipulating organ the stem 35 can be pulled to the right into an extreme position wherein the plate 33 is applied against the ring disk 20, pressing the same to the right so that the canted pins 16 penetrate through the holes 18 and lift the tails of the pawls 23 for disengaging the latter from the internal toothing 24 of the ring cup 25.

The rotation of the chain pinion 29 is transmitted over the support 26 and by the intermediate ratchet gear 28, 8 with unaltered speed upon the internally toothed wheel 8 of the planetary gear. This wheel 8 drives the four planetary pinions 6 which impart rotation upon the pinion support 5 thereof at a lower speed than the speed of the driving pinion 29. The pawls 9 engage the internal toothing 11 of the ring cup 12 and drive the hub 14 at a low speed ratio.

No part of the described change speed gear is specially delicate as all parts can be of solid structure. No precautions at all must be taken and the treadling must not be interrupted while operating the change speed gear to raise the speed ratio. When operating the gear in the opposite direction, that is for reducing the speed ratio, the treadling must be slowed down below the actual speed of the driven cycle wheel. However, this single precaution is practically identical with the natural behavior of the cyclist when reducing the speed.

The invention is not limited to the embodiment above described and illustrated in the drawing, nor is it only applicable to cycles. It is understood that other constructions and combinations of parts may be made which fall within the scope of the appended claims.

I claim:

1. Change speed gear for three graduated speed ratios comprising a rigid axle, a driving wheel rotatable thereabout, a planetary gear driven by said driving wheel and revolving round said axle, three ratchet gears constituting respective rotary connections, the first one thereof between the pinion support of said planetary gear and the mechanism to be driven, the second one between said driving wheel and the internally toothed wheel of said planetary gear, the third one between said internally toothed planetary wheel and the mechanism to be driven, each ratchet gear having two pivotally mounted pawls, the outer ends of which are engaged, under the effect of springs, in the toothing of the co-ordinate ratchet wheel, an annular disk reciprocatable along said rigid axle, two pins fixed in said disk and projecting with canted ends towards the pawls of the third cited ratchet gear, so as to lift said pawls out of engagement upon movement of said disk against the action of restoring springs, and a controlling organ reciprocatably mounted upon said rigid axle and adapted to put said disk and pins in disengaging position, said controlling organ being provided to take two further predetermined positions, so as to connect the driving wheel for rotation with said pinion support of the planetary gear and with said internally toothed wheel of the same, respectively.

2. In a change speed gear for three graduated speed ratios of the character specified having a hollow rigid axle, a driving wheel rotatable thereabout, a planetary gear revolving round said axle, three ratchet gears for respective transmission of the rotation of said driving wheel at three predetermined speed ratios upon the mechanism to be driven, each ratchet gear having two pawls engaged in the toothing of the ratchet wheel; an operable stem longitudinally movable in said hollow axle, a support slidable in a longitudinal slot of said axle under the action of a restoring spring and fixed to one end of said stem, a plate integral with said driving wheel for rotation round said axle and integral with said support for reciprocation along said axle and having a ratchet toothing for engagement with the ratchet toothing of the pinion support of said planetary gear, and an annular disk carrying projecting pins with canted ends and being reciprocatable under the action of restoring springs by the intermediary of said plate for placing the ratchet gear destined for the transmission of rotation at high speed ratio out of operation after said plate is disengaged from said pinion support of the planetary gear.

PIERRE PFISTER.